March 26, 1963  K. S. JAEGER  3,082,760
PIPE END HEATING APPARATUS AND METHOD
Filed Sept. 28, 1960
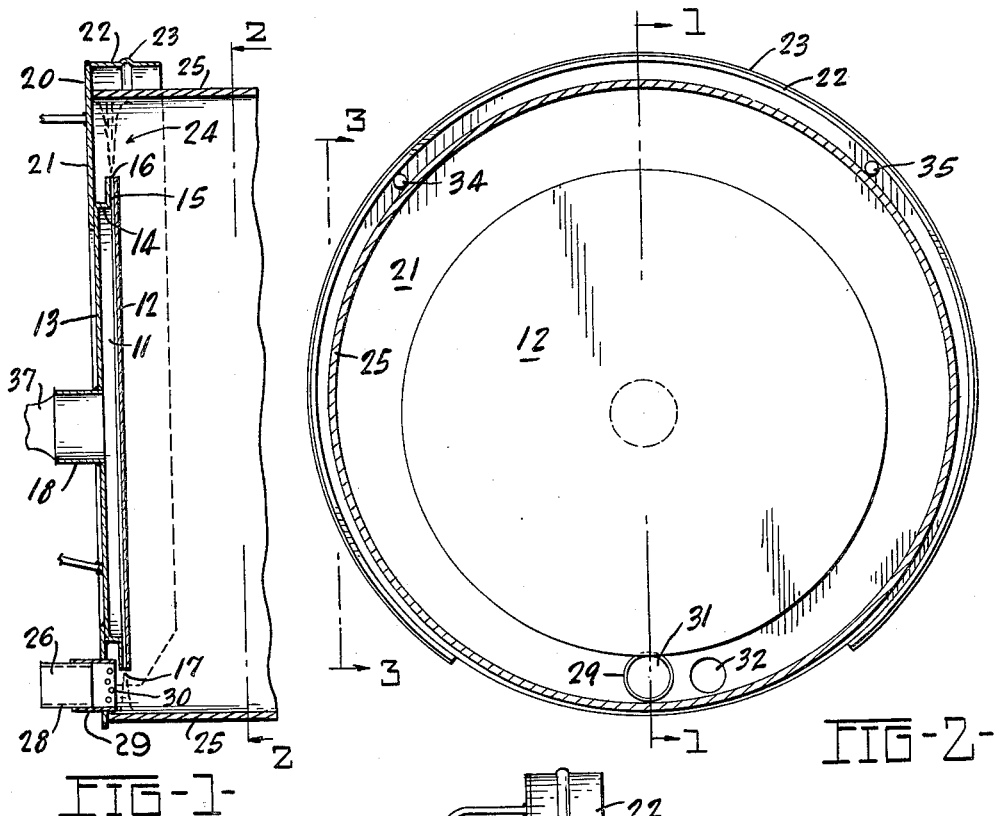
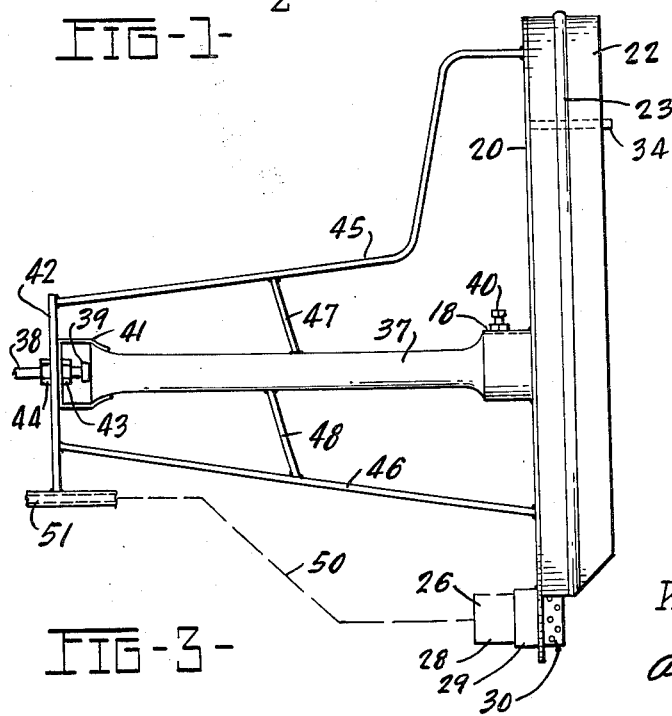
INVENTOR:
KURT S. JAEGER.
BY
Alfred L. Patmore, Jr.
ATTY.

# 3,082,760
PIPE END HEATING APPARATUS AND METHOD
Kurt S. Jaeger, Tulsa, Okla., assignor to Midland-Ross Corporation, Toledo, Ohio, a corporation of Ohio
Filed Sept. 28, 1960, Ser. No. 59,022
3 Claims. (Cl. 126—271.2)

This invention relates to the art of constructing metallic cross-country pipe lines for the transmission of oil, natural gas and the like. The invention relates especially to novel apparatus and method for heating the ends of metallic pipe or conduit sections prior to joining the ends by welding.

In the art of welding sections of metallic pipe or conduit for cross-country pipe lines it is very desirable, especially in cold weather to preheat the pipe ends to a temperature of 150° F. or greater prior to welding in order to safeguard against crystallization of the weld material which may be caused by the high carbon content of the pipe material and by the high temperature differential between the hot weld and the cold pipe. Such crystallization can often result in cracking of the weld. The practice prior to my invention comprised manually heating the pipe end with an acetylene torch or the like. This practice is unsatisfactory because the pipe end is not heated uniformly. By the time a workman passes the flame from a torch around the periphery of a large diameter pipe end the starting point on the pipe has had considerable time to cool. This effect is further aggravated in severe winter weather. Furthermore, the practice of heating with a torch is very time consuming and is therefore very costly.

Accordingly, novel pipe end heating apparatus and method has been developed which is capable of rapidly and uniformly heating pipe ends. Further, the apparatus is light enough to be hand-carried from one pipe joint to another. Further, this apparatus has been provided with windbreaking means to render it relatively insensitive to high velocity wind conditions which frequently prevail in the outdoor geographical areas where pipe line construction is very active, such as in the southwest portion of the United States. Further, the apparatus is relatively inexpensive to manufacture.

The novel pipe end heating apparatus employs a circular plenum, preferably cylindrical, with port or aperture means around the outside periphery thereof. A combustible mixture of fuel and air is delivered to the plenum. Ignition means, such as a constantly burning pilot, are provided to ignite the combustible mixture which issues from the plenum through the port or aperture means around the periphery of the plenum, thus providing a substantially continuous ring of flame around the plenum. A suitable windbreaker, such as a substantially continuous flange, may be permanently attached to the pipe end heater, as by welding to the plenum. The apparatus is utilized to heat pipe ends by inserting the plenum of the pipe end heater inside the opening defined by the pipe wall near the pipe end.

Where the pipe end heater will always be used to heat pipe of substantially the same diameter, as will normally be the case, it is possible to provide the apparatus with suitable locating means to easily locate the apparatus in proper relationship with the pipe end. Such locating means should be properly arranged to compensate for the tendency of the flame to be longer near the upper portion of the plenum.

For further consideration of what I believe to be novel, and my invention, attention is directed to the following portion of the specification, the appended claims, and the accompanying drawing.

FIGURE 1 is a partial side elevational cross-sectional view of the apparatus taken on line 1—1 of FIGURE 2.

FIGURE 2 is a front elevational view of the apparatus shown in heating relationship with the end of a pipe.

FIGURE 3 is a side elevational view of the apparatus taken on line 3—3 of FIGURE 2 except that the apparatus is not shown in heating relationship with a pipe end.

The apparatus comprises a plenum chamber, indicated generally at 11, which is defined by frontplate 12, backplate 13, and peripheral flange 14. Attached to peripheral flange 14 is a radially extending flange 15 which is located in the assembled plenum adjacent the outside perimeter of frontplate 12. Backplate 13, peripheral flange 14, and radially extending flange 15 may be constructed from a unitary metallic piece, as shown, as by stamping. Frontplate 12 is permanently secured at a predetermined distance from flange 15 by means of tack welds 16 around the coinciding peripheries of flange 15 and frontplate 12, thereby forming a substantially continuous aperture 17 between flange 15 and front plate 12. Frontplate 12 may be maintained at the proper distance from flange 15 during the tack welding process by temporarily inserting small pieces of shim stock therebetween, which may be removed after frontplate 12 is secured to flange 15, or by placing periodic spot welds on either frontplate 12 or flange 15.

A combustible mixture of fuel and air is delivered to plenum chamber 11 by conduit means, hereinafter described, which terminates within sleeve 18 which is attached to backplate 13 and circumscribes an aperture centrally located therein. The combustible mixture which is thusly delivered to plenum chamber 11 may pass therefrom through aperture 17.

Plenum chamber 11 is provided with a windbreaker indicated generally at 20. Windbreaker 20 comprises an annular plate 21 permanently attached to backplate 13 and extending substantially beyond coincident peripheries of flange 15 and frontplate 12. Attached to the outer periphery of plate 21, and extending frontwards therefrom, is an arcuate flange 22 with a longitudinal bead 23 for rigidity. I prefer that flange 22 be discontinued adjacent the bottom of the pipe-end heater, as by eliminating the lowermost quadrant of a circular flange, to avoid interference with the ground or other obstructions near the bottom of the pipe end. Flange 22 and the coincident peripheries of flange 15 and front-plate 12 define an annular pocket 24 adapted to receive and substantially circumscribe the end of a pipe 25.

The pipe end heating apparatus is provided with pilot means, shown generally at 26, whereby the combustible mixture passing from aperture 17 may be ignited thereby producing a substantially continuous peripheral ring of flame which uniformly and rapidly heats pipe end 25 from its inside surface.

Pilot means 26 comprises pilot nozzle 28 and pilot nozzle shield 29 which contains a plurality of perforations 30. Perforated shield 29, which is located within an aperture 31 of plate 21 adjacent a point of aperture 17, circumscribes the outlet of nozzle 28 and acts as a pilot wind guard in much the same manner as the perforated shield which surrounds the wick in conventional wind resistant cigarette lighting devices and the like. A second aperture 32 is provided in plate 21 closely proximate pilot means 26 by which the combustible mixture passing from nozzle 28 may be readily ignited, as by means of a torch, a match, a sparking device, or the like.

Where the apparatus will always be used to heat pipe of substantially the same diameter, which is the usual case, positioning means may be provided so that the apparatus may be quickly positioned in proper heating relationship with the pipe end. My preferred positioning means, which I find very simple and quite satisfactory, utilizes annular plate 21 in combination with pins 34 and 35 attached thereto and located in the first and fourth quadrants approximately 90° from each other. The apparatus is readily positionable by allowing it to rest on the outside of the pipe wall at the pins and by pushing it in until the pipe end abuts against plate 21. Pins 34 and 35 should preferably be located in such a manner so that the axis of the end heating apparatus will be positioned slightly below the axis of the pipe end to compensate for the tendency of the flame to be slightly longer at the top of the apparatus than at the bottom. This tendency is caused by the natural draft pressure differential between the bottom and top of the plenum chamber. I also prefer to construct my apparatus so that the inside periphery of windbreaker flange 22 is in direct communication with pins 34 and 35 to reinforce the pins.

There are available in the prior art several suitable means for delivering a combustible mixture of fuel and air to plenum chamber 11, a primary consideration in selecting the particular means being the type of fuel which is preferred. Since it is important that the end heating apparatus be readily movable to heat the ends of pipe sections located in dispersed areas of the construction region, it is desirable that the apparatus be operated on a fuel from a source which is convenient to the dispersed areas. It is also desirable that the fuel be relatively inexpensive. A fuel which I find convenient and relatively inexpensive is liquefied petroleum gas (L.P.G.) which may be carried in a tank of convenient handling size by a truck or earth moving tractor or by a small portable hand cart. By utilizing a moderately short length of flexible conduit for delivering fuel from the fuel tank to the pipe end heater the apparatus will have a further degree of mobility independent of the mobility of the fuel tank.

In my preferred embodiment, which I desire to operate on L.P.G., I utilize a conventional prior art inspirating device 37, as shown in FIG. 3, as the means for mixing the L.P.G. fuel with a correct proportion of air to properly sustain combustion. A stream of fuel is delivered from the fuel tank by a conduit 38, partially shown, and discharged by nozzle 39 within the throat of atmospherically exposed inspirator 37, thereby entraining mixing air from the atmosphere. The outlet end of inspirator 37 terminates within sleeve 18, being retained therein by bolt 40, the inspirator thereby being in fluid communication with plenum chamber 11.

Permanently attached to the inlet end of inspirator 37 is mounting bracket 41. Bracket 41 abuts against plate 42 and is secured thereto by means of nuts 43 and 44 and conduit 38 which passes through an aperture, not shown, in plate 42. Plate 42 is permanently attached to plate 21 by means of ribs 45 and 46 extending therebetween. Ribs 45 and 46 are secured, respectively, to inspirator by means of struts 47 and 48.

To deliver a combustible mixture of fuel and air to pilot 26, additional inspirator means not shown, similar to, but smaller than, inspirator 37 may be provided. To simplify the apparatus it is desirable that the pilot be operated on a common fuel source with the heater. However, because it is desirable that the pilot remain burning while the end heating apparatus be shut off during the period when the apparatus is being moved from one pipe end to another, the piping control means for the pilot should be separate from the control means for the end heating apparatus. A portion of piping conduit 50 to pilot 26 may be attached by welding to plate 42 as shown generally at 51.

While my preferred embodiment, as I have already pointed out, comprises a plenum of cylindrical configuration with aperture means on the outside periphery of the plenum so that the pipe end can be heated by inserting the plenum inside the end of the pipe to be heated, it is to be understood that other embodiments are possible. For example, the pipe end could be heated by inserting it inside the opening defined by a plenum of annular or toroidal configuration. Such a plenum would incorporate the port or aperture means on the inside periphery of the plenum. I do not prefer this embodiment because the flame, which is not shielded by the wall of the pipe end, is more wind sensitive; and the apparatus is bulkier to handle. Also, in the preferred embodiment heater in which the plenum is enclosed by the pipe end, the plenum may be constructed in an annular or toroidial rather than a cylindrical configuration, or it may be of conical configuration along the axis.

Various other modifications can be made in the apparatus illustrated and described without departing from the spirit of the claims, as the embodiments of the invention shown and described are intended as illustrative only.

I claim:

1. In combination with a horizontally disposed pipe, apparatus adapted to heat the end of said pipe comprising, in combination: wall means defining a thin circular plenum chamber having peripheral aperture means; means for delivering a combustible mixture of fuel and air to said plenum chamber; wind shielding means including a generally annular plate attached to said plenum chamber and extending outwardly therefrom in all directions past the outer periphery of the pipe end being heated, said plate being adapted to abut against the pipe end when the apparatus is in heating relationship with the pipe end; and positioning means adapted to readily locate the axis of the peripheral aperture means in a predetermined relationship with the axis of the pipe end.

2. Apparatus according to claim 1 in which the predetermined relationship between the axis of the peripheral aperture means and the axis of the pipe end is characterized by the fact that the axis of the peripheral aperture means is lower in elevation than the axis of the pipe end.

3. Apparatus according to claim 1 in which said wind shielding means further comprises an arcuate axially extending flange attached to said plate, said flange being adapted to surround a portion of the pipe end.

References Cited in the file of this patent

UNITED STATES PATENTS

| | | |
|---|---|---|
| 2,294,168 | Francis et al. | Aug. 25, 1942 |
| 2,412,758 | Smith | Dec. 17, 1946 |
| 2,482,937 | Rooke | Sept. 27, 1949 |
| 2,609,871 | Brumbaugh | Sept. 9, 1952 |